(12) United States Patent  (10) Patent No.: US 9,412,981 B2
Nakayama  (45) Date of Patent: Aug. 9, 2016

(54) ELECTRONIC DEVICE

(71) Applicant: CASIO COMPUTER CO., LTD., Shibuya-ku (JP)

(72) Inventor: Kenji Nakayama, Iruma (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 100 days.

(21) Appl. No.: 14/531,759

(22) Filed: Nov. 3, 2014

(65) Prior Publication Data
US 2015/0125724 A1 May 7, 2015

(30) Foreign Application Priority Data

Nov. 5, 2013 (JP) .................................. 2013-228960

(51) Int. Cl.
H01M 2/12 (2006.01)
H01M 2/10 (2006.01)
(52) U.S. Cl.
CPC .......... *H01M 2/1022* (2013.01); *H01M 2/1061* (2013.01); *H01M 2/1229* (2013.01); *H01M 2/1276* (2013.01)

(58) Field of Classification Search
None
See application file for complete search history.

(56) References Cited

FOREIGN PATENT DOCUMENTS

JP 06-168712 6/1994
JP 2002-151032 5/2002

*Primary Examiner* — Patrick Ryan
*Assistant Examiner* — Wyatt McConnell
(74) *Attorney, Agent, or Firm* — Cozen O'Connor

(57) ABSTRACT

An electronic device includes a body that houses an electronic component in a casing and at least one belt connected to the body. The belt includes a battery housing that houses a battery and a first opening in communication with the battery housing. The casing includes a second opening in communication with the first opening and a release valve that discharges gas in the casing to the outside of the casing when gas released from the battery housed in the battery housing flows through the first and second openings into the casing to increase the pressure in the casing to an atmospheric pressure of a certain level or higher.

10 Claims, 8 Drawing Sheets

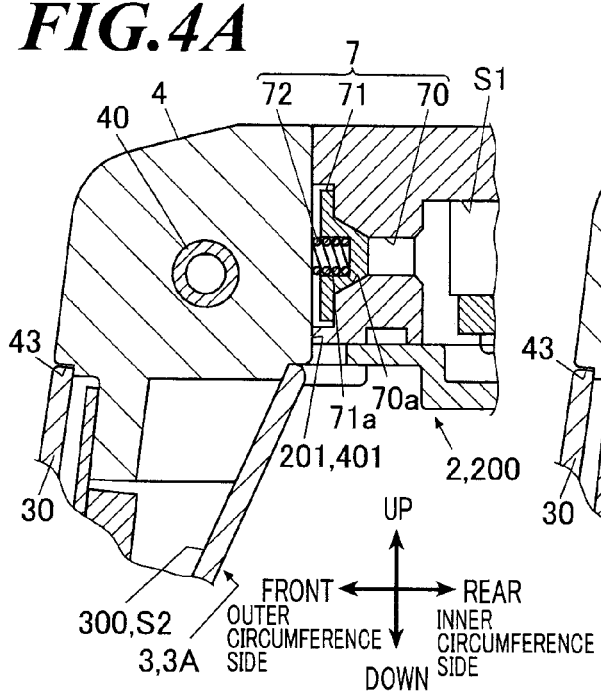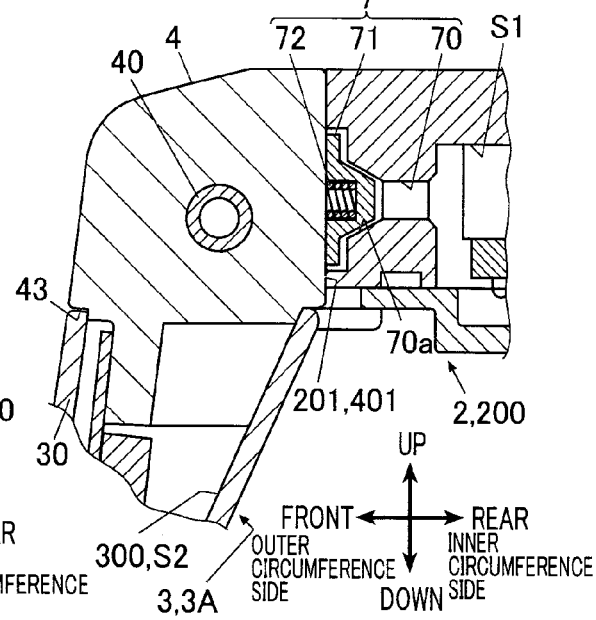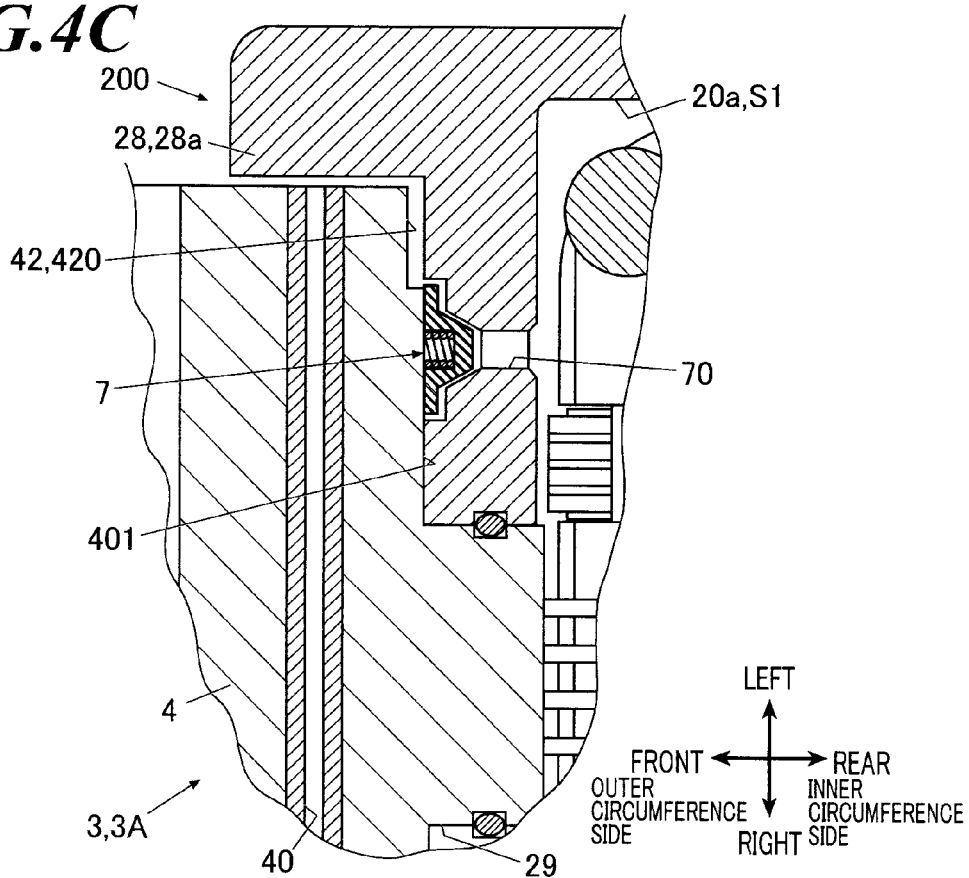

ELECTRONIC DEVICE

CROSS REFERENCE TO RELATED APPLICATION

This application is based upon and claims the benefit of priority under 35 USC 119 of Japanese Patent Application No. 2013-228960 filed on Nov. 5, 2013, the entire disclosure of which, including the description, claims, drawings and abstract, is incorporated herein by reference in its entirety.

BACKGROUND OF THE INVENTION

1. Field of the Invention

The present invention relates to an electronic device that houses a battery inside a belt connected to the body of the electronic device.

2. Description of Related Art

Conventional electronic device provided with built-in secondary batteries such as lithium-ion batteries have a risk of vaporization of liquid electrolytes to cause leakage of gas from the batteries due to a rapid temperature rise or a short circuit between electrodes inside the batteries. To prevent rupture of products, the battery cases are provided with gas release valves, that is to say, so-called explosion-proof valves (see, for example, JP H06-168712A).

In recent compact electronic devices carried by users, the batteries are housed in belts connected to the bodies of the devices (see, for example, JP2002-151032A).

A belt housing a battery without ingenuity, however, inevitably requires an explosion-proof valve (release valve) in the belt, failing to miniaturize the product. This also impairs the appearance of the product. In addition, the belt and battery are consumables and are thus designed to be replaced every time the consumables are worn or run down. An explosion-proof valve provided in such a component results in increases in cost for replacement parts, which eventually results in additional running costs of the electronic device.

SUMMARY OF THE INVENTION

An object of the present invention is to provide a compact electronic device that can release gas generated in a battery built in a belt to the outside.

In order to achieve at least one of the objects, according to a first aspect of the present invention, there is provided an electronic device including: a body that houses an electronic component in a casing; and at least one belt connected to the body; wherein the belt including: a battery housing that houses a battery; and a first opening in communication with the battery housing, and wherein the casing including: a second opening in communication with the first opening; and a release valve that discharges gas in the casing to the outside of the casing when gas released from the battery housed in the battery housing flows through the first and second openings into the casing to increase the pressure in the casing to an atmospheric pressure of a certain level or higher.

BRIEF DESCRIPTION OF THE DRAWINGS

The present invention will become more fully understood from the detailed description given hereinafter and the appended drawings, which are given by way of illustration only and thus are not intended as a definition of the limits of the present invention, wherein:

FIGS. 4A, 4B, and 4C show the release valve;

DESCRIPTION OF THE PREFERRED EMBODIMENTS

With reference to the accompanying drawings, an exemplary electronic device will now be described in detail in accordance with embodiments of the present invention. The scope of the present invention should not be limited to the illustrated examples.

1. Electronic Device

Figure 1A:
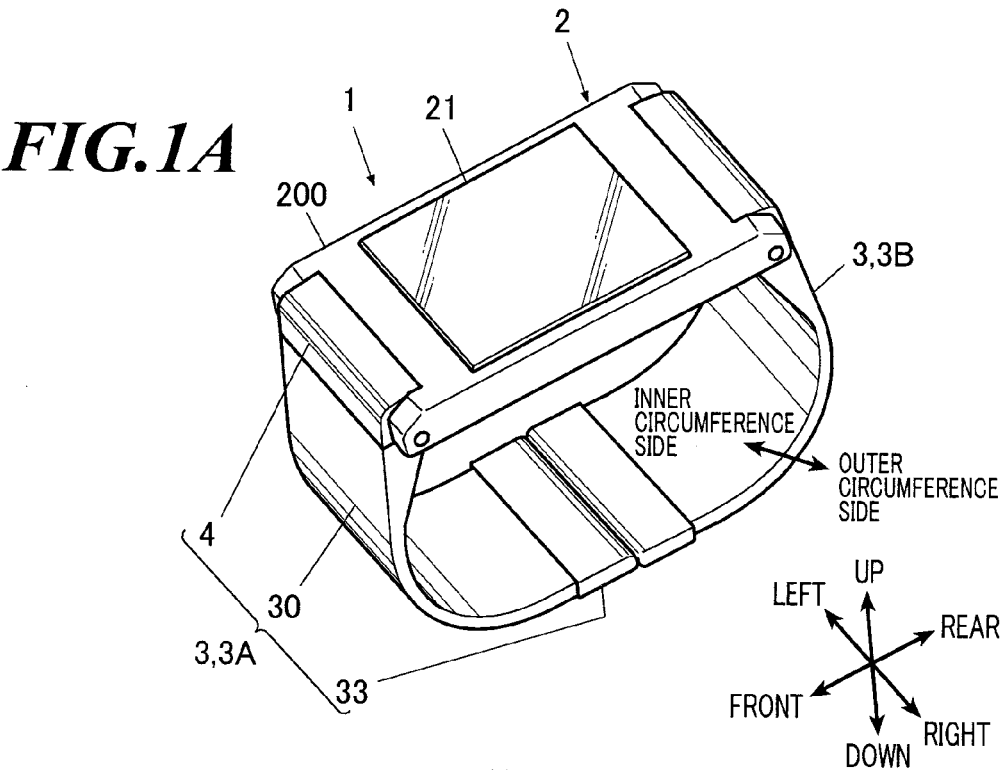
FIG. 1A is a perspective view of an electronic device.
Figure 1B:
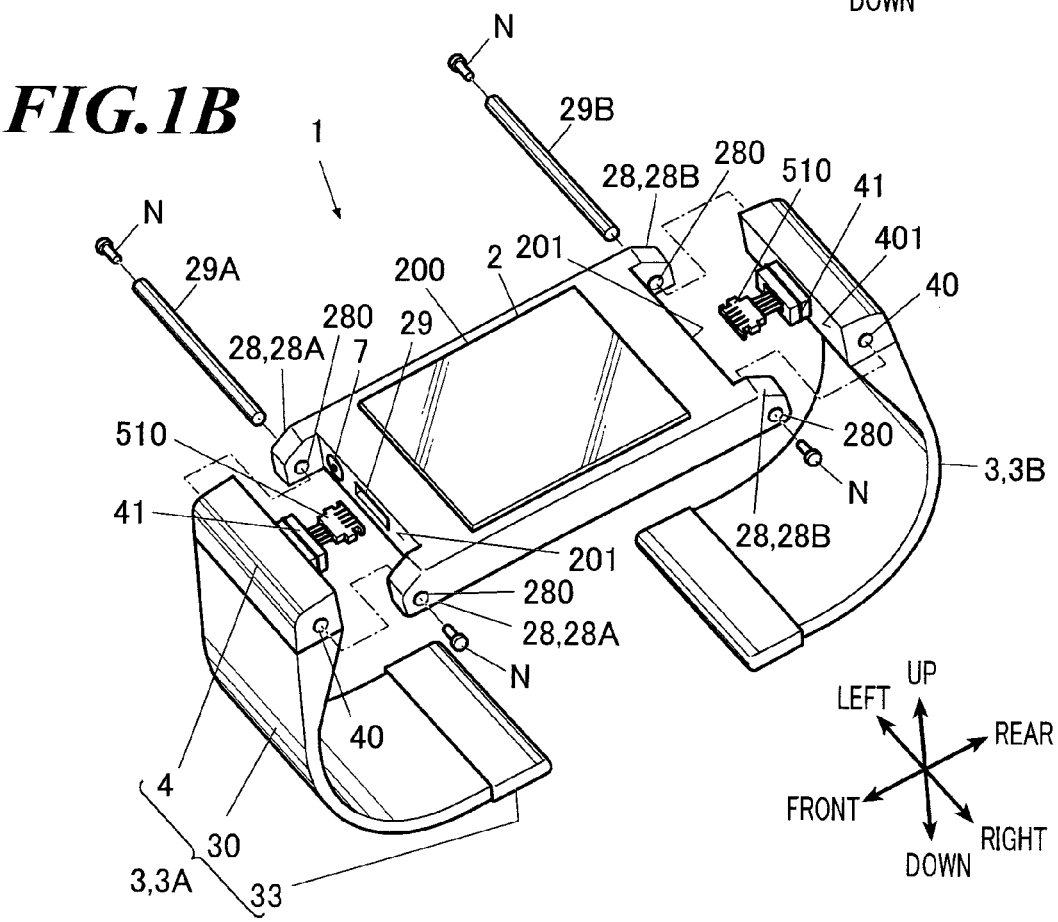
FIG. 1B is an exploded perspective view of the electronic device.

FIGS. 1A and 1B show an electronic device 1 in accordance with an embodiment of the present invention.

As shown in FIGS. 1A and 1B, the electronic device 1 in accordance with the embodiment is an annular wristband terminal to be put on user's wrist. The electronic device 1 includes a body 2 in the form of a plate and two belts 3. In the following description, for convenience, the visible side in FIGS. 1A and 1B of the body 2 of the electronic device is referred to as an upper side, while the side opposite to the upper side is referred to as a lower side, to define the vertical direction. The side of the body 2 connected to one (hereinafter also referred to as a belt 3A) of the two belts 3 is referred to as a front side, whereas the side connected to the other (hereinafter also referred to as a belt 3B) of the belts 3 as a rear side, to define the front-rear direction. The right side when seen from the front to the rear is referred to as a right side, whereas the left side when seen from the front to the rear as a left side, to define the right-left direction. The side near user's wrist when the electronic device 1 is put on user's wrist is referred to as an inner circumference side, whereas the side far from the user's wrist as an outer circumference side.

2. Body of Electronic Device

Figure 2:
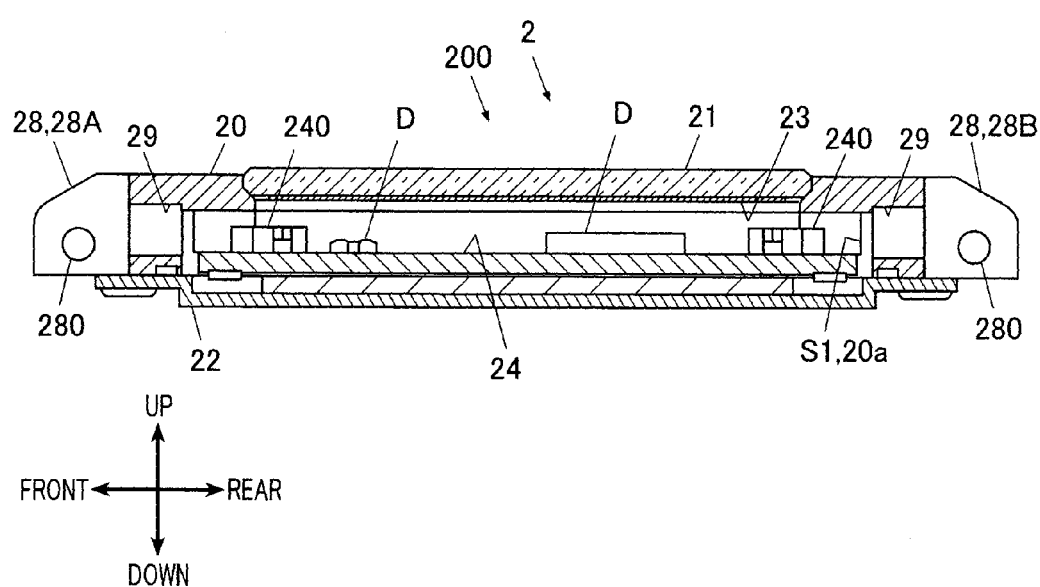
FIG. 2 is a cross-sectional view of a schematic configuration of the body of an electronic device.

The body 2 of the electronic device is in the form of a rectangular plate. As shown in FIG. 2, an electronic component housing S1 inside a casing 200 houses electronic components D.

In particular, the casing 200 of the body 2 of the electronic device has a rectangular frame 20 provided with a vertically through hole 20a. A transparent top cover 21 is fitted onto the upper end of the through hole 20a. The lower end of the through hole 20a is covered with a bottom lid 22. A display 23 is disposed under the top cover 21. A printed circuit board (PCB) 24 is disposed between the display 23 and the bottom lid 22. At least one electronic component D is mounted on the PCB 24. With this configuration, a housing S1 for the electronic component composed of the rectangular frame 20, the top cover 21, and the bottom lid 22 houses the display 23 and the electronic component(s) D. In this embodiment, the PCB 24 has power supply terminals 240 at front and rear ends of the upper surface of the PCB 24.

As shown in FIG. 1B, each of the end surfaces in the front-rear direction of the casing 200 described above, i.e., each of the opposing surfaces 201 facing the respective belts 3 has an opening 29 in a middle portion thereof. Each opposing surface 201 has protrusions (mount portions) 28 at opposed ends in the right-left direction.

The openings 29 are second openings (body openings) in accordance with the present invention and are in communication with the electronic component housing 51. The openings 29 expose the power supply terminals 240 on the PCB 24 (see FIG. 2) and are designed to receive the respective protrusions 41 of the belts 3 described below.

The protrusions 28 serve as portions to mount the belts 3 on the body 2 of the electronic device. The protrusions 28 protrude forward or rearward from the respective opposing surfaces 201 in the front-rear direction of the casing 200. Each protrusion 28 is provided with a through hole 280 extending in the right-left direction.

The through holes 280 in the two front-side protrusions 28 (hereinafter also referred to as protrusions 28A) of the through holes 280 in these protrusions 28 are designed such that one rod-shaped fastening shaft 29A is insertable into the through holes 280. The opposite ends of the fastening shaft 29A are fixable in the through holes 280 with screws N. With this configuration, the fastening shaft 29A is inserted in sequence into the through hole 280 of one protrusion 28A, a through hole 40 in the belt 3A described below, and the through hole 280 of the other protrusion 28A. In this state, the opposite ends of the fastening shaft 29A are fastened with the screws N, whereby the belt 3A is removably mounted on the body 2 of the electronic device.

Similarly, the through holes 280 in the two rear protrusions 28 (hereinafter also referred to as protrusions 28B) are designed such that one rod-shaped fastening shaft 29B is insertable into the through holes 280. The opposite ends of the fastening shaft 29B are fixable in the through holes 280 with screws N. With this configuration, the fastening shaft 29B is inserted in sequence into the through hole 280 of one protrusion 28B, a through hole 40 in the belt 3B described below, and the through hole 280 of the other protrusion 28B. In this state, the opposite ends of the fastening shaft 29B are fastened with the screws N, whereby the belt 3B is removably mounted on the body 2 of the electronic device.

At least one opposing surface 201 (the opposing surface 201 on the front side in this embodiment) of the front and rear opposing surfaces 201 of the casing 200 described above has a release valve 7 (an explosion-proof valve).

Figure 3A:
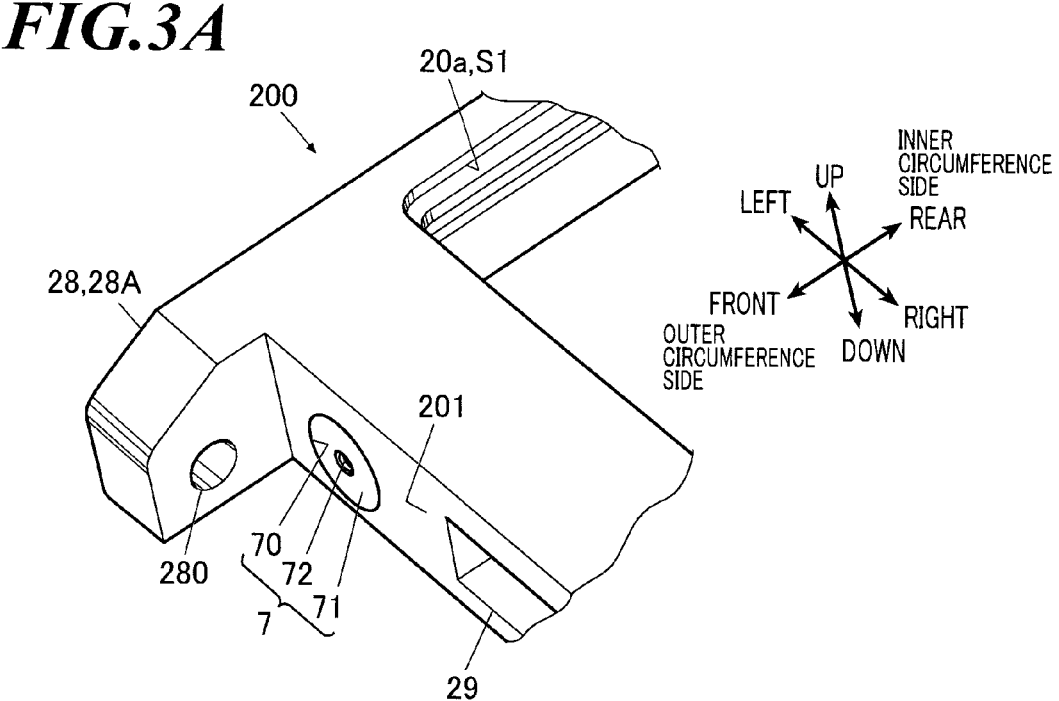
FIGS. 3A and 3B show a release valve.
Figure 3B:
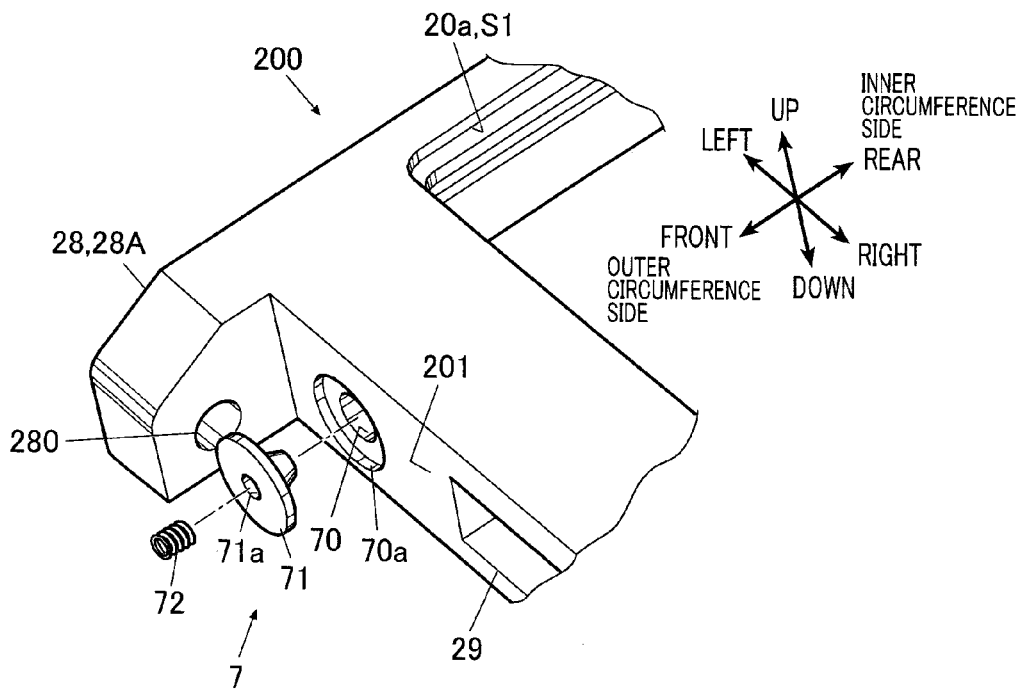

The release valve 7 discharges gas in the housing S1 of the electronic component to the outside of the casing 200 when the atmospheric pressure of the housing S1 of the electronic component exceeds a certain level (more precisely, the atmospheric pressure of the housing S1 of the electronic component exceeds a certain level as compared with the outside pressure (generally one atmospheric pressure)). Such gas discharge through the release valve 7 prevents the casing 200 and other components from exploding. As shown in FIGS. 3A and 3B, the release valve 7 has a gas outlet 70, a lid 71, and a biasing member 72.

The gas outlet 70 is a hole to discharge gas in the housing S1 of the electronic component to the outside of the casing 200. The gas outlet 70 extends in the front-rear direction from the opposing surface 201 of the casing 200 to face the belt 3A to an inner wall of the housing S1 for the electronic component. In accordance with the present embodiment, the gas outlet 70, as shown in FIGS. 4A and 4B, includes a circular truncated cone recess 70a at the front end. The recess 70a has a greater diameter at the front compared to the rear.

The lid 71, as shown in FIGS. 3, 4A, and 4B, comes into contact with the gas outlet 70 from the front to cover the gas outlet 70. The lid 71 is a circular truncated cone and has a larger diameter at the front compared to the rear. In accordance with the present embodiment, the lid 71 is provided on the front surface (the bottom surface of the circular truncated cone) with a cylindrical recess 71a. The outer diameter of the lid 71 is smaller than the inner diameter of the recess 70a. The height (the length of the front-rear direction) of the lid 71 is less than the depth (the length of the front-rear direction) of the recess 70a of the gas outlet 70. Such a configuration allows the lid 71 to move in the front-rear direction inside the recess 70a.

The biasing member 72 presses the lid 71 rearward, i.e., toward the casing 200. In accordance with the present embodiment, the biasing member 72 is disposed in the recess 71a of the lid 71. As shown in FIG. 4A, the biasing member 72 exerts its biasing force toward the casing 200 in cooperation with the reaction force by the belt 3A mounted on the protrusions 28A. Although the biasing member 72 used in the present embodiment is a coiled spring, it may be other elastic members, such as sponge or rubber.

3. Belt

As shown in FIG. 1, two belts 3 are mounted on the front protrusions 28A and the rear protrusions 28B, respectively, of the body 2 of the electronic device. These belts 3 are engagable with each other to form a loop with the body 2 of the electronic device. As shown in FIGS. 1A, 1B, 5A, and 5B, the belts 3 are each composed of a flexible strip belt body 30, a belt connector 4 that connects the belt body 30 to the body 2 of the electronic device, and a buckle 33 that engages the belts 3. A battery housing S2 inside the belt body 30 and the belt connector 4 houses a battery 50.

3-1. Buckle

The buckle 33 of one belt 3 removably engages with the buckle 33 of the other belt 3 mounted on the body 2 of the electronic device. The buckle 33 is connected to the distal end of the belt body 30 (i.e., on the side opposite to the body 2 of the electronic device).

3-2. Belt Connector

The belt connector 4 having a pillar shape extends in the right-left direction and is connected to the proximal end of the belt body 30 (i.e., connected to the side of the belt body 30 near the body 2 of the electronic device). The belt connector 4 has a right-left length smaller than the distance between the two protrusions 28A (or 28B). The belt connector 4 is disposed between these protrusions 28A (or 28B) and abutable against the front (or rear) opposing surface 201 of the body 2 of the electronic device.

Figure 5A:
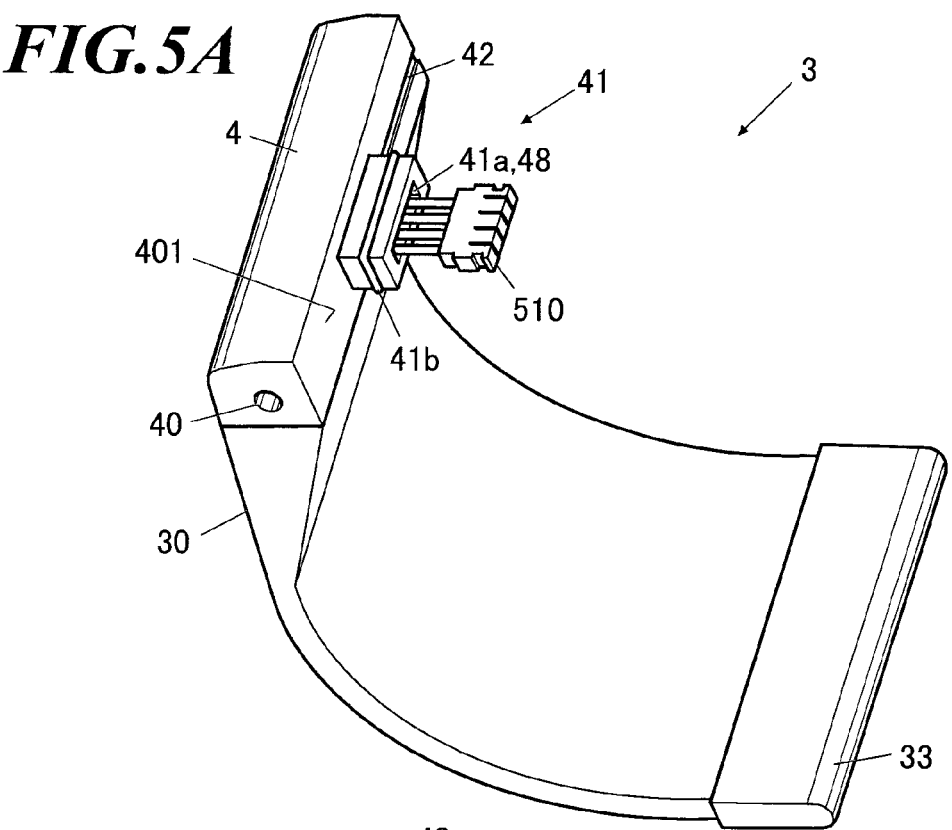
FIGS. 5A and 5B show a belt.
Figure 5B:
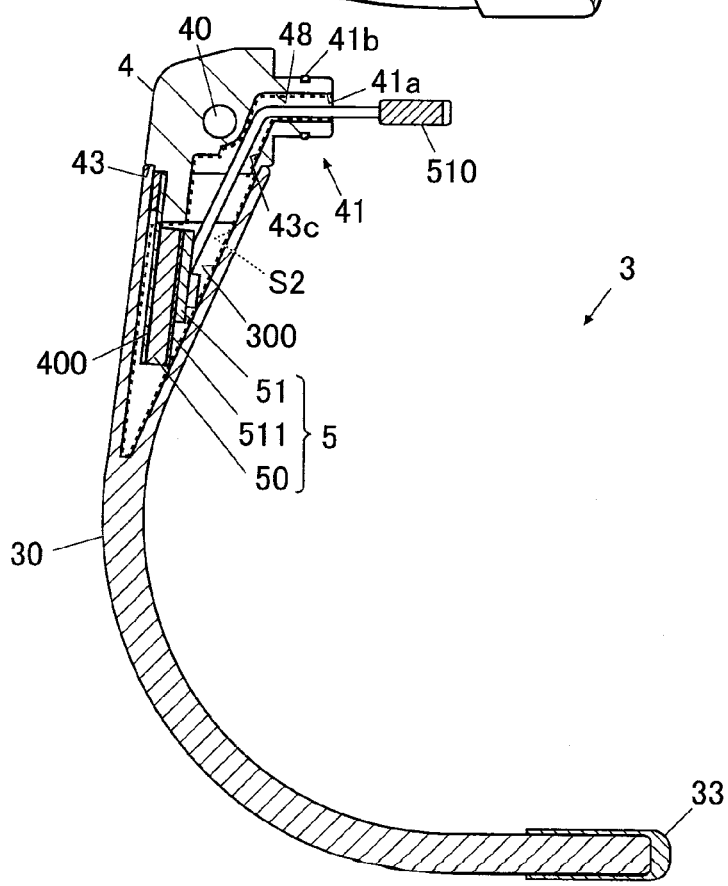
Figure 6A:
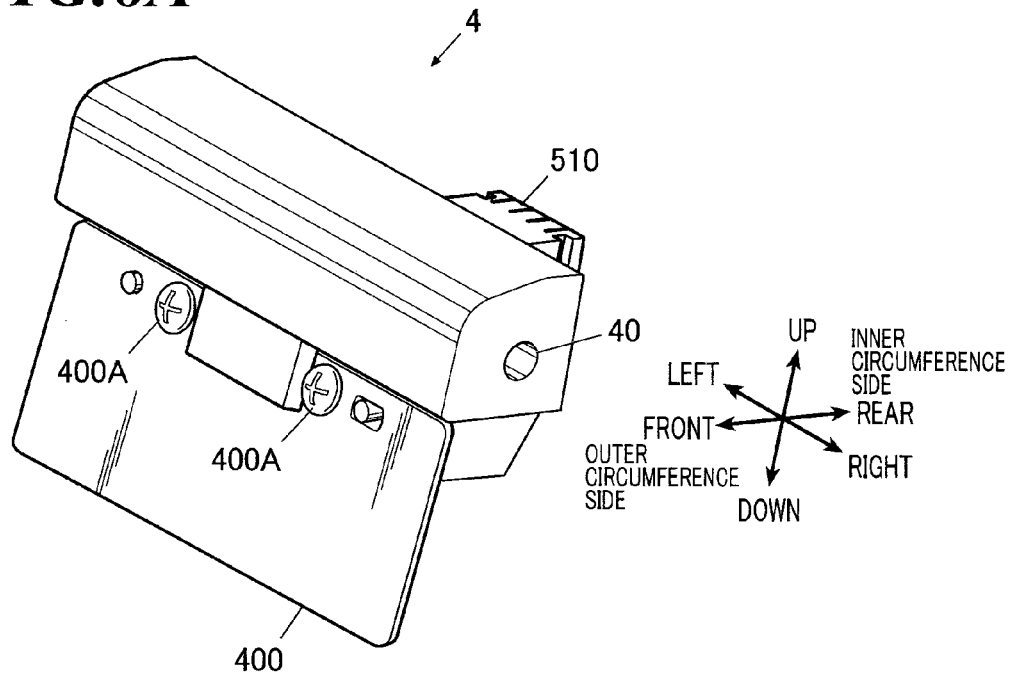
FIGS. 6A and 6B show a belt connector and other components.
Figure 6B:
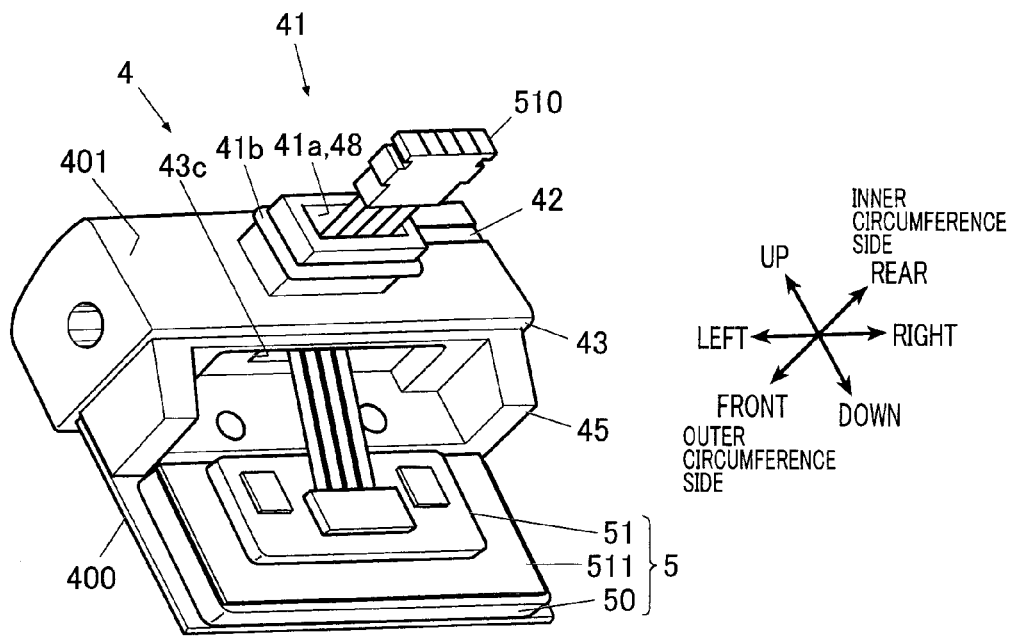

As shown in FIGS. 5A, 5B, 6A, and 6B, the belt connector 4 is provided with a through hole 40 extending in the right-left direction. The fastening shaft 29A or 29B (see FIG. 1B) described above is inserted into the through hole 40 when the belt 3 is mounted on the body 2 of the electronic device. For convenience of illustration, FIGS. 6A and 6B show the belt connector 4 of the front belt 3A. The belt connector 4 of the rear belt 3B has the same structure as that of the front belt 3A.

The belt connector 4 has an opposing surface (front or rear surface) 401 which faces the body 2 of the electronic device. The opposing surface 401 is provided with an opening 48, a protrusion 41, and a groove 42. The opening 48 is in communication with the below-described battery housing S2 defined by the belt connector 4 and the belt body 30. The protrusion 41 protrudes toward the body 2 of the electronic device. The groove 42 forms a void between the opposing surface 401 and the body 2 of the electronic device.

The opening 48 is a first opening (belt opening) in accordance with the present invention. The opening 48 faces the opening 29 in the casing 200 of the body 2 of the electronic device.

The protrusion 41 is inserted and fit into the opening 29 of the casing 200 when the belt 3 is mounted on the body 2 of the electronic device. The protrusion 41 is tubular and surrounds the periphery of the opening 48 on the opposing surface 401. The protrusion 41 has a through hole 41a and is provided with an O-ring 41b. The through hole 41a extending in the front-rear direction is inside the protrusion 41. The O-ring 41b is on the circumference of the protrusion 41. The through hole 41a is configured such that the opening 48 on the opposing surface 401 is in communication with the housing S1 of the electronic component when the protrusion 41 is inserted into the opening 29 of the body 2 of the electronic device. When the protrusion 41 is inserted into the opening 29, the O-ring 41b seals the gap between the opening 29 and the protrusion 41.

As shown in FIGS. 4C and 6B, the groove 42 extends from a position facing the release valve 7 of the body 2 of the electronic device to an edge of the opposing surface 401. A channel 420 is defined between the groove 42 and the body 2 of the electronic device. The channel 420 allows gas released from the gas outlet 70 of the release valve 7 to flow to the outside.

As shown in FIG. 6B, the belt connector 4 has an opposing surface (lower surface in the present embodiment) facing the belt body 30. An opening 43c and a protrusion 45 are provided on the opposing surface 43. The opening 43c is in communication with the opening 48 described above. The protrusion 45 protrudes toward the belt body 30, that is to say, downward so as to enclose the opening 43c from the right, the left, and the front. In particular, the protrusion 45 extends through the right, left, and front edges of the opposing surface 43. When seen from the below, the protrusion 45 is approximately U-shaped. The entire protrusion 45 is smaller in thickness and in the right-left dimension of the belt 3 than the proximal end of the belt body 30.

The protrusion 45 has a surface on the outer circumference side. A rectangular plate support 400 hanging from the opposing surface 43 of the belt connector 4 is fastened on this surface with screws 400A. The support 400 may be flexible.

As shown in FIG. 6B, the surface of the support 400 on the inner circumference side supports the power source 5.

The power source 5 is provided with a battery 50 and a protection circuit board 51. The battery 50 supplies the body 2 of the electronic device with electricity. The protection circuit board 51 cuts off the power supply in the event of abnormality.

The battery 50 in accordance with the present embodiment is a plate which is thin in the direction of the thickness of the belt 3. This battery 50 is a secondary battery such as a lithium-ion battery, but may be a primary battery.

The protection circuit board 51 having a terminal 510 and a fuse (not shown) is electrically connected to the battery 50.

The terminal 510 is inserted into the opening 43c on the opposing surface 43 of the belt connector 4, the opening 48, the through hole 41a of the protrusion 41, and the opening 29 in the casing 200 of the body 2 of the electronic device. The inserted terminal 510 is electrically connected to the power supply terminal 240 on the PCB 24. In this state, the battery 50 is electrically connected, through the opening 43c, the opening 48, the through hole 41a, and the opening 29, to the PCB 24. Such a battery 50 can supply each electronic component D on the PCB 24 with electric power. A protective sheet 511 is disposed between the protection circuit board 51 and the battery 50 to prevent thermal interaction, for example. The power source 5 may be flexible.

3-3. Belt Body

As shown in FIGS. 5A and 5B, the belt body 30 is a strip member with a predetermined thickness. The proximal end of the belt body 30 is connected to the belt connector 4. A recess 300 is disposed inside at least the proximal end of the belt body 30. The recess 300 extends from the end surface of the belt body 30 on the side of the connector 4 toward the distal end of the belt body 30. The recess 300 houses the protrusion 45 provided on the opposing surface 43 of the belt connector 4 and the power source 5 fixed on the protrusion 45.

The proximal end of the belt body 30 is in tight contact with the opposing surface 43 of the belt connector 4. With this configuration, as shown by dashed lines in figures, the recess 300 of the belt body 30 and the opposing surface 43 of the belt connector 4 together define the battery housing S2 that houses the power source 5.

4. Method for Assembling Electronic Device

A method for assembling the electronic device 1 will now be described.

As shown in FIG. 1A, the fastening shaft 29A is inserted in sequence into the through hole 280 of one protrusion 28A, the through hole 40 of the belt 3A, and the through hole 280 of the other protrusion 28A. In this state, the opposite ends of the fastening shaft 29A are fastened with the screws N, whereby the belt 3A is mounted on the body 2 of the electronic device. Similarly, the fastening shaft 29B is inserted in sequence into the through hole 280 of one protrusion 28B, the through hole 40 of the belt 3B, and the through hole 280 of the other protrusion 28B. In this state, the opposite ends of the fastening shaft 29B are fastened with the screws N, whereby the belt 3B is mounted on the body 2 of the electronic device.

In this state, while the terminal 510 of the power source 5 in the battery housing S2 is electrically connected to the terminal 240 on the PCB 24 in the housing S1 of the electronic component, the protrusion 41 of the belt connector 4 is inserted into the opening 29 of the body 2 of the electronic device. The opening 48 provided on the opposing surface 401 facing the body 2 of the electronic device of the belt connector 4 is in communication, through the through hole 41a of the protrusion 41, with the electronic component housing S1 of the body 2 of the electronic device. As a result, the electronic component housing S1 of the body 2 of the electronic device is in communication with the battery housing S2 of the belt 3. The above-mentioned insertion of the protrusion 41 of the belt connector 4 into the opening 29 of the body 2 of the electronic device also causes the O-ring 41b of the protrusion 41 to seal the gap between the protrusion 41 and the opening 29. In this state, the airtight housing of the electronic components D in the housing S1 and the airtight housing of the battery 50 in the housing S2 are achieved. The communicating portion between the electronic component housing S1 and the battery housing S2 is sealed so that gas generated in the battery housing S2 flows through the openings 48 and 29 into the electronic component housing S1.

In this state, the lid 71 comes into contact with the gas outlet 70 on the opposing surface 201 of the casing 200 of the body 2, while the biasing member 72 is disposed in the recess 71a of the lid 71. The biasing member 72 exerts its biasing force to press the lid 71 toward the casing 200 in cooperation with the reaction force by the opposing surface 401 of the belt connector 4 of the belt 3A, thereby forming the release valve 7. As a result, until the internal pressure of the electronic component housing S1 reaches a certain level (for example, three atmospheres, and more precisely atmospheric pressures increased by a certain level (two atmospheres) from the outside pressure (one atmosphere)), the airtight condition in the electronic component housing S1 is maintained.

5. Operational Advantage

The operational advantage of the electrical device 1 in case of abnormality of the battery 50 will now be described.

Figure 7A:
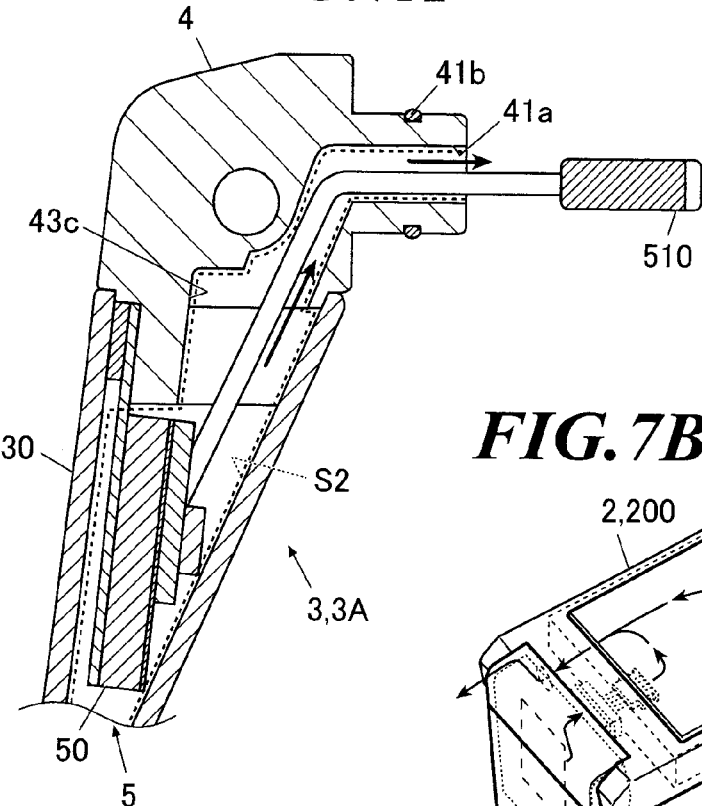
FIGS. 7A, 7B, and 7C illustrate operational advantages of the electronic device when gas is released from the battery.
Figure 7B:
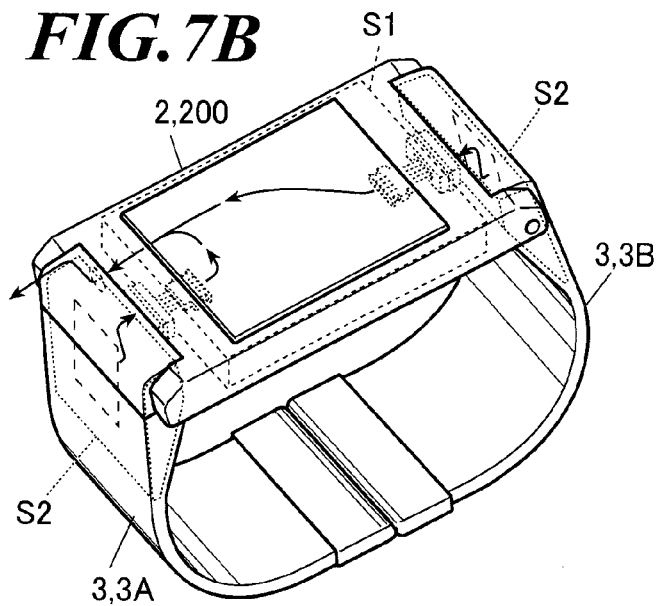

When abnormality of the battery 50 occurs, gas leaks from the battery 50 to fill the battery housing S2 and the housing S1 of the electronic component in communication with the battery housing S2 as shown in FIGS. 7A and 7B. This increases the internal pressure of the battery housing S2 and that of the electronic component housing S1.

This causes the lid 71 to be pressed from the inside of the electronic component housing S1. While the internal pressure of the electronic component housing S1 is less than a predetermined level (for example, two atmospheres), the airtight condition in the electronic component housing S1 and the battery housing S2 is maintained, as shown in FIG. 4A. This is because the pressing force of the internal pressure of the electronic component housing S1 that presses the lid 71 to the outside is less than the pressing force of the biasing member 72 that presses the lid 71 to the inside of the electronic component housing S1.

Figure 7C:
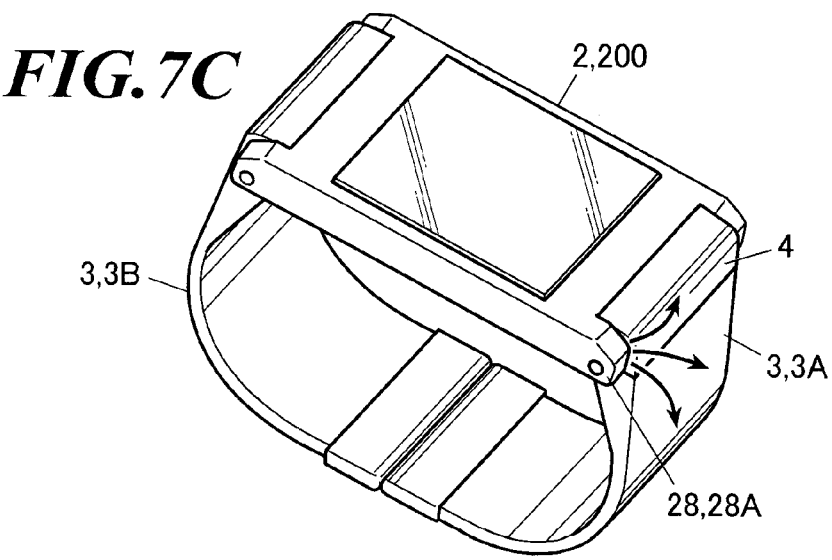

When the internal pressure of the electronic component housing S1 reaches a certain level (for example, three atmospheres, and more precisely, atmospheric pressures increased by a certain level (two atmospheres) from the outside pressure (one atmosphere)) or higher, the lid 71 and the gas outlet 70 are spaced apart as shown in FIG. 4B, and gas in the electronic component housing S1 is discharged through the gas outlet 70. In this state, as shown in FIGS. 4C and 7C, gas released from the gas outlet 70 flows through the channel 420 between the body 2 of the electronic device and the belt 3A to be discharged to the outside.

In accordance with the embodiment described above, the belt 3 is provided with the battery housing S2 and the opening 48 while the casing 200 is provided with the electronic component housing S1, the opening 29, and the release valve 7. The battery housing S2 houses the battery 50. The opening 48 is disposed on the opposing surface 401 facing the casing 200, and is in communication with the battery housing S2. The electronic component housing S1 houses the electronic component D and other components. The opening 29 is disposed at a position facing the opening 48 on the opposing surface 201 facing the belt 3, and is in communication with the electronic component housing S1. The release valve 7 discharges gas in the electronic component housing S1 to the outside of the casing 200 when the atmospheric pressure in the electronic component housing S1 reaches a certain level or higher. The opening 29 of the body 2 of the electronic device is in communication with the opening 48 of the belt 3. At this communicating portion, a gap is sealed so that gas released from the battery 50 to the battery housing S2 is caused to flow through the openings 48 and 29 to the electronic component housing S1. Gas released from the battery 50 built in the belt 3, therefore, may be discharged through the release valve 7 of the casing 200 to the outside. The release valve 7 thus provided in the casing 200 of the body 2 of the electronic device allows gas from the battery 50 to be discharged. As compared to the case of the release valve 7 provided in the belt 3, the release valve 7 thus provided in the casing 200 allows the miniaturization of the product and the prevention of the impaired appearance of the product. The release valve 7 provided in the casing 200 also contributes to reductions in running costs of the electronic device 1 as compared to the case of the release valve 7 provided in the consumable belt 3.

The gas outlet 70 that discharges gas in the electronic component housing S1 to the outside of the casing 200 is disposed on the opposing surface 201 of the casing 200 which faces the belt 3. The groove 42 is disposed on the opposing surface 401 of the belt 3 which faces the casing 200, and extends from a position facing the gas outlet 70 to the edge of the opposing surface 401. With this configuration, gas discharged from the gas outlet 70 is reliably released to the outside of the electronic device 1.

The battery 50 is electrically connected through the openings 48 and 29 to the PCB 24 in the electronic component housing S1. The openings 48 and 29 to communicate the electronic component housing S1 with the battery housing S2 may also serve as openings for wiring that electrically connects the battery 50 to the electronic component D on the PCB 24. The structure of the electronic device 1 thus configured may be more simplified as compared to the case where the openings for communication and the openings for wiring are provided separately.

The release valve 7 is provided with the gas outlet 70, the lid 71, and the biasing member 72. The gas outlet 70 discharges gas in the electronic component housing S1 to the outside of the casing 200. The lid 71 comes into contact with the gas outlet 70 from the outside of the casing 200 to cover the gas outlet 70. The biasing member 72 exerts its biasing force to press the lid 71 toward the electronic component housing S1. Such a structure prevents each component of the release valve 7 from being damaged when gas is discharged from the release valve 7. After the battery 50 from which gas has been released is replaced, the electronic device 1 may be continuously used without requiring the replacement of the casing 200, which contributes to reductions in running costs of the electronic device 1.

The electronic device 1 is provided with two belts 3. The electrical power supplied to the body 2 of the electronic device 1 including the two belts 3 can be increased as compared to the case where only one belt 3 is provided. The electronic device 1 in accordance with the present invention including only the single release valve 7 may have a simplified structure as compared to the case where two release valves 7 are provided.

Applicable embodiments for the present invention should not be limited to the embodiments and modifications described above, and the embodiments may be appropriately modified within the scope of the present invention.

For example, the electronic device 1 in accordance with the present invention is applicable to various electronic devices such as a cellular phone, a personal computer, a personal digital assistant (PDA), and a gaming device.

In the embodiments described above, the recess 300 of the belt body 30 and the opposing surface 43 of the belt connector 4 form the battery housing S2. As long as the battery housing S2 is formed between the belt body 30 and the belt connector 4, only the belt connector 4 may have a recess, or both the belt body 30 and the belt connector 4 may have respective recesses.

In the embodiments described above, a tubular protrusion 41 provided on the periphery of the opening 48 of the belt connector 4 is inserted into the opening 29 of the body 2 of the electronic device to communicate the electronic component housing S1 with the battery housing S2. Alternatively, a tubular protrusion provided on the periphery of the opening 29 of the body 2 of the electric device may be inserted into the opening 48 of the belt connector 4 to communicate the electronic component housing S1 with the battery housing S2.

Figure 8A:
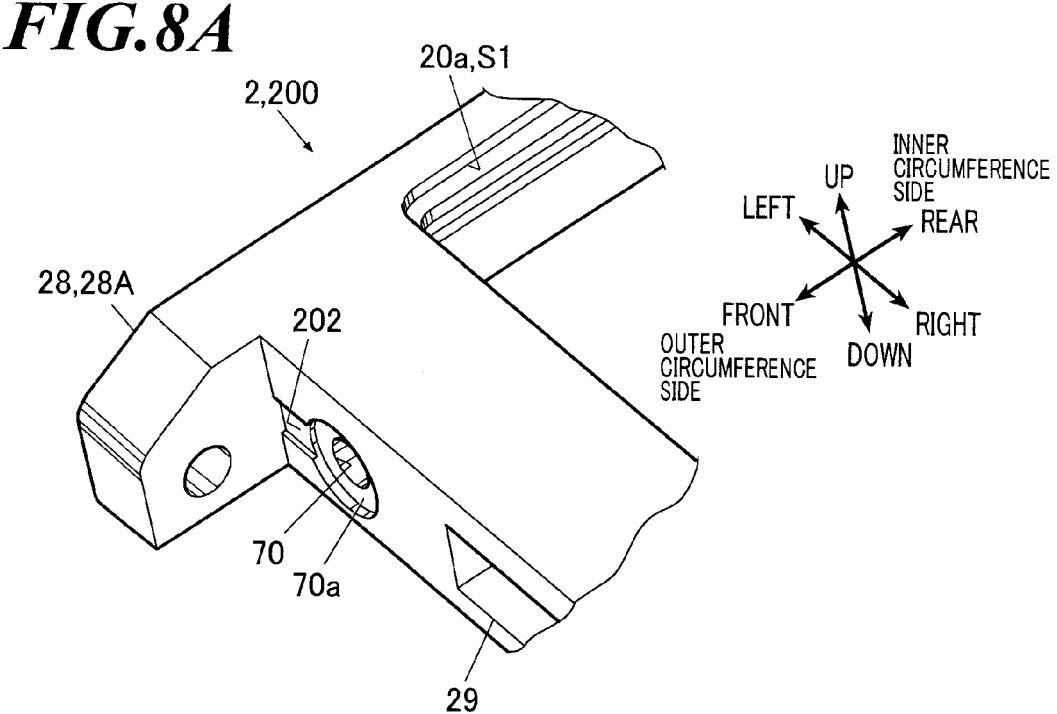
FIGS. 8A and 8B show modifications of a groove.
Figure 8B:
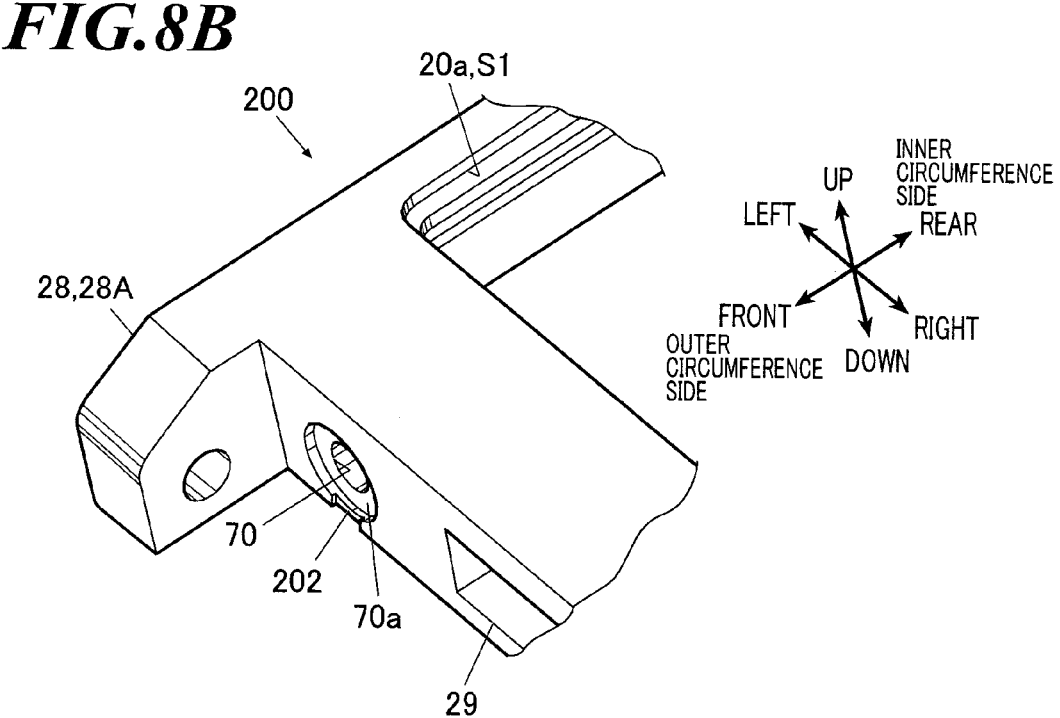

In the embodiments described above, the groove 42 to form a void (channel 420) between the casing 200 and the belt connector 4 is formed on the opposing surface 401 of the belt connector 4 which faces the casing 200. As shown in FIGS. 8A and 8B, a groove 202 may be formed on the opposing surface 201 of the casing 200 which faces the belt connector 4. The groove 202 shown in FIGS. 8A and 8B and formed on the opposing surface 201 extends from an edge of the gas outlet 70 to an edge of the opposing surface 201. In particular, the groove 202 in FIG. 8A extends to the left end of the opposing surface 201, while the groove 202 in FIG. 8B extends to the lower edge of the opposing surface 201.

While some embodiments of the present invention are described, the scope of the present invention is not limited to the above-described embodiments, but includes the scope of the claims and the full scope of their equivalents.

What is claimed is:

1. An electronic device comprising:
   a body that houses an electronic component in a casing; and
   at least one belt connected to the body; wherein the belt comprising:
      a battery housing that houses a battery; and
      a first opening in communication with the battery housing, and
   the casing comprising:
      a second opening in communication with the first opening; and
      a release valve that discharges gas in the casing to the outside of the casing when gas released from the battery housed in the battery housing flows through the first and second openings into the casing to increase the pressure in the casing to an atmospheric pressure of a certain level or higher.

2. The electronic device according to claim 1, wherein
   the casing further comprises an electronic component housing that houses the electronic component,
   the first opening is disposed on an opposing surface of the belt which faces the casing,
   the second opening is disposed at a position facing the first opening on an opposing surface of the casing which faces the belt, the second opening being in communication with the first opening and the electronic component housing, and
   the release valve discharges gas in the electronic component housing to the outside of the casing when an atmospheric pressure of the electronic component housing reaches a certain level or higher.

3. The electronic device according to claim 1, wherein a communicating portion between the first opening and the second opening is sealed such that gas released from the battery to the battery housing flows through the first and second openings into the electronic component housing.

4. The electronic device according to claim 1, wherein
   the release valve includes a gas outlet that discharges gas in the casing to the outside of the casing, and the gas outlet is disposed on the opposing surface of the casing which faces the belt, and
   the belt includes a groove disposed on the opposing surface of the belt which faces the casing, and the groove extends from a position opposite to the gas outlet to an edge of the opposing surface of the belt.

5. The electronic device according to claim 1, wherein
   the release valve includes the gas outlet which discharges gas in the casing to the outside of the casing and which is disposed on the opposing surface of the casing which faces the belt, and
   the casing includes a groove which is disposed on the opposing surface of the casing which faces the belt and which extends from an edge of the gas outlet to an edge of the opposing surface of the casing.

6. The electronic device according to claim 1, wherein the battery is electrically connected through the first and second openings to the electronic component in the casing.

7. The electronic device according to claim 1, wherein the release valve comprises:
   a gas outlet that discharges gas in the electronic component housing to the outside of the casing;
   a lid that comes into contact with the gas outlet from the outside of the casing to cover the gas outlet; and
   a biasing member that press the lid toward the inside of the casing.

8. The electronic device according to claim 1, wherein
   two belts are provided, and
   only the single release valve is provided.

9. A body of an electronic device which houses an electronic component in a casing and which is connected to a belt comprising a battery housing that houses a battery and a first opening in communication with the battery housing, the body comprising:
   a second opening in communication with the first opening; and
   a release valve that discharges gas in the casing to the outside of the casing when gas released from the battery housed in the battery housing of the belt flows through the first opening of the belt and the second opening into the casing to increase the pressure in the casing to an atmospheric pressure of a certain level or higher.

10. A belt connected to a body of an electronic device that houses an electronic component in a casing, the belt comprising:
    a battery housing that houses a battery; and
    a first opening in communication with the battery housing,
    wherein the gas in the casing is discharged to the outside of the casing through a release valve provided in the casing of the body of the electronic device when gas released from the battery housed in the battery housing flows through the first opening and a second opening of the body into the casing to increase the pressure in the casing to an atmospheric pressure of a certain level or higher.

* * * * *